(12) United States Patent
Cao et al.

(10) Patent No.: US 11,894,525 B2
(45) Date of Patent: Feb. 6, 2024

(54) BATTERY MODULE AND VEHICLE

(71) Applicant: CONTEMPORARY AMPEREX TECHNOLOGY CO., LIMITED, Ningde (CN)

(72) Inventors: Gen Cao, Ningde (CN); Jihua Yao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 482 days.

(21) Appl. No.: 17/125,843

(22) Filed: Dec. 17, 2020

(65) Prior Publication Data
US 2021/0151805 A1    May 20, 2021

Related U.S. Application Data

(63) Continuation of application No. PCT/CN2020/100959, filed on Jul. 9, 2020.

(30) Foreign Application Priority Data

Aug. 29, 2019 (CN) .......................... 201910805814.5

(51) Int. Cl.
*H01M 10/42* (2006.01)
*B60L 50/64* (2019.01)
*B60L 58/24* (2019.01)

(52) U.S. Cl.
CPC .......... *H01M 10/425* (2013.01); *B60L 50/64* (2019.02); *B60L 58/24* (2019.02); *H01M 10/4207* (2013.01); *H01M 2010/4271* (2013.01)

(58) Field of Classification Search
CPC .................. H01M 10/425; H01M 10/4207
See application file for complete search history.

(56) References Cited

U.S. PATENT DOCUMENTS

| | | | |
|---|---|---|---|
| 5,830,599 A | * | 11/1998 | Okamoto ................ B60L 58/26 429/58 |
| 6,455,190 B1 | | 9/2002 | Inoue et al. |
| 2017/0250395 A1 | | 8/2017 | Cheon et al. |

FOREIGN PATENT DOCUMENTS

| CN | 1277467 A | 12/2000 |
|---|---|---|
| CN | 1289153 A | 3/2001 |

(Continued)

OTHER PUBLICATIONS

Ningder Age New Energy Technology Co., Ltd., Office Action, CN201910805814.5, dated Jul. 6, 2021, 14 pgs.

(Continued)

*Primary Examiner* — Karie O'Neill Apicella
(74) *Attorney, Agent, or Firm* — Kilpatrick Townsend & Stockton LLP

(57) ABSTRACT

This application relates to the battery field, and discloses a battery module and an electric vehicle using the battery module. The battery module includes a battery, a plugging member, and a temperature collection assembly. The battery includes a housing and a cover plate connected to the housing, where the cover plate is provided with a temperature collection hole. The plugging member includes an insertion portion that is installed in the temperature collection hole, and the insertion portion is provided with an accommodating cavity extending into an interior of the housing. The temperature collection assembly includes a temperature collection portion installed inside the accommodating cavity. According to this application, the temperature collection assembly collects a temperature inside the housing via the plugging member in the temperature collection hole. In this way, temperature collection is more accurate, a thermal conductive path is short, and a temperature collection response speed is fast.

18 Claims, 17 Drawing Sheets

(56) References Cited

FOREIGN PATENT DOCUMENTS

| | | | |
|---|---|---|---|
| CN | 206076363 U | 4/2017 | |
| CN | 206711955 U | 12/2017 | |
| CN | 208847366 U | 5/2019 | |
| CN | 209389072 U | 9/2019 | |
| CN | 210136984 U * | 3/2020 | ............ H01M 10/48 |
| CN | 210136984 U | 3/2020 | |
| JP | H0927350 A * | 1/1997 | ............ H01M 10/12 |
| JP | H0927350 A | 1/1997 | |

OTHER PUBLICATIONS

Contemporary Amperex Technology Co., Limited, Extended European Search Report, EP20827975.2, dated Oct. 11, 2021, 17 pgs.
Contemporary Amperex Technology Co., Limited, International Search Report and Written Opinion, PCT/CN2020/100959, dated Oct. 13, 2020, 18 pgs.

* cited by examiner

BATTERY MODULE AND VEHICLE

CROSS REFERENCE TO RELATED APPLICATIONS

This application is a continuation application of PCT Patent Application No. PCT/CN2020/100959, entitled "BATTERY MODULE AND VEHICLE" filed on Jul. 9, 2020, which claims priority to Chinese Patent Application No. 201910805814.5, filed with the State Intellectual Property Office of the People's Republic of China on Aug. 29, 2019, and entitled "BATTERY MODULE", all of which are incorporated herein by reference in their entirety.

TECHNICAL FIELD

This application relates to the battery field, and in particular, to a battery module and a vehicle.

BACKGROUND

A normal operating temperature of a battery module ranges between −30° C. and 55° C. If the limit temperatures are exceeded, the battery module limits power to protect battery module safety.

An existing temperature collection method of the battery module is as follows: collecting a temperature of a connection strap through a thermistor disposed on a circuit board, and using the temperature of the connection strap as a temperature inside a battery. In an actual situation, the temperature of the connection strap is relatively high, while the temperature inside the battery is relatively low. If a difference between the two temperatures is large, the battery module will limit power in advance, which affects performance of the battery module.

Currently, all original equipment manufacturers in the industry are developing in a direction of coupe model, and traditional modified electric vehicles should reflect advantages and characteristics of fast acceleration of the electric vehicles. Therefore, a demand for a fast acceleration working condition will be increasingly common, to be specific, power requirements will be increasingly high.

SUMMARY

This application proposes a battery module to optimize a structure of the battery module.

An embodiment of this application provides a battery module, including:
- a battery, including a housing and a cover plate connected to the housing, where the cover plate is provided with a temperature collection hole;
- a plugging member, including an insertion portion, the insertion portion installed in the temperature collection hole, and the insertion portion is provided with an accommodating cavity extending into an interior of the housing; and
- a temperature collection assembly, including a temperature collection portion, where the temperature collection portion is installed inside the accommodating cavity.

In some embodiments, the temperature collection assembly further includes:
- a wire, electrically connected to the temperature collection portion, one end of the wire is located inside the accommodating cavity, and the other end of the wire is located outside the accommodating cavity.

In some embodiments, an outer wall of the insertion portion is adjacent to or in contact with an electrode assembly inside the housing.

In some embodiments, thermal conductive sealant is provided between the temperature collection portion and an inner wall of the accommodating cavity.

In some embodiments, the plugging member further includes:
- a sealing portion, arranged at an end of the insertion portion that is close to the cover plate, where the sealing portion is clamped in a peripheral area of the temperature collection hole.

In some embodiments, the cover plate is provided with a sink groove that communicates with the temperature collection hole, and the sealing portion is installed in the sink groove.

In some embodiments, the sealing portion is annular and is integral with the insertion portion.

In some embodiments, the battery module further includes:
- a wire harness board, installed on the top of the cover plate, where the wire harness board is provided with a buckle, and the buckle is connected to the wire.

In some embodiments, the battery module further includes a circuit board, where the circuit board is arranged on the top of the cover plate, and the circuit board includes a connector socket.

The temperature collection assembly further includes a connector plug that is electrically connected to the other end of the wire, where the connector plug is electrically connected to the connector socket.

In some embodiments, the battery module includes two or more batteries arranged in rows, and the temperature collection portion is installed on at least one of the batteries.

In addition, an embodiment of this application further provides a vehicle including the foregoing battery module.

In the battery module provided in the foregoing technical solution, the temperature collection portion of the temperature collection assembly is installed in the accommodating cavity of the plugging member, and the accommodating cavity of the plugging member is basically located inside the housing of the battery. A temperature of the plugging member is basically consistent with a temperature inside the battery, and the plugging member is capable of timely reflecting changes and levels of the temperature inside the battery. If the temperature inside the battery rises, the temperature of the plugging member increases in a timely manner; and if the temperature inside the battery decreases, the temperature of the plugging member decreases in a timely manner. The temperature of the plugging member varies with the temperature inside the battery in a timely manner.

In the battery module provided in the foregoing technical solution, a temperature transfer path of the battery module is: The temperature inside the battery is transferred to a wall body of the plugging member, and the temperature of the plugging member is directly transferred to the temperature collection portion of the temperature collection assembly. The temperature collection assembly transfers the collected temperature to components such as the circuit board for subsequent analysis, processing, and judgment. It can be learned from the foregoing temperature transfer path that the battery module provided in the foregoing technical solution can reflect temperature changes inside the battery in a timely manner during collection of the temperature inside the battery. The temperature transfer path is short and a temperature response speed is fast. In addition, this makes control more accurate for subsequent processing based on the collected temperature. Therefore, this can effectively reduce or even prevent occurrence of power limitation performed by the battery module in advance. In this way, efficiency of the battery module can be effectively exerted, a structure and performance of the battery module are effectively optimized, performance of a vehicle using the battery module is also optimized, and reliability of the vehicle is increased.

BRIEF DESCRIPTION OF DRAWINGS

The drawings described herein are intended for a further understanding of this application and constitute a part of this application. Example embodiments of this application and descriptions thereof are intended to explain this application, and do not constitute any inappropriate limitation on this application. In the drawings.

DESCRIPTION OF EMBODIMENTS

Figure 1:
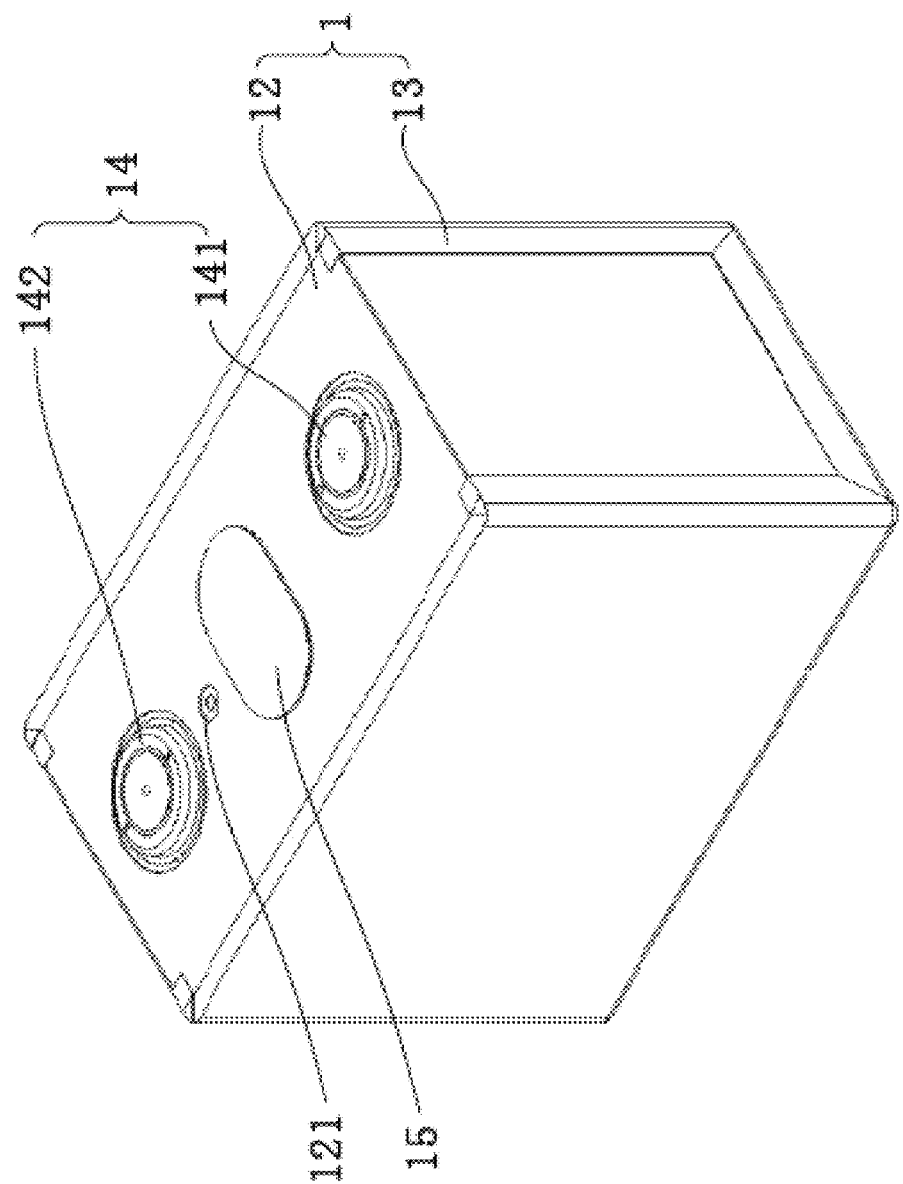
FIG. 1 is a schematic structural diagram of a battery, that does not have a plugging member installed, of a battery module according to an embodiment of this application.

As noted above, there are various problems with the conventional solutions, including a limited space in the battery module, and negative impact of manufacturing and costs, a width and a thickness of the connection strap cannot be large. In a low-power condition, for example, discharging in 1C, the temperature of the connection strap is close to the temperature inside the battery. However, if a higher discharge rate is used, the temperature of the connection strap may far exceed the temperature inside the battery. In a high-power condition, due to the limited overcurrent area of the connection strap, the temperature of the connection strap rises sharply, while the temperature inside the battery rises slowly, and a temperature difference is huge. This causes the battery module to limit the power in advance, affecting the discharge power of the module. Therefore, how to detect a temperature inside the battery is a technical problem that needs an urgent solution.

The technical solutions provided in this application will be described in more detail below with reference to FIG. 1 to FIG. 17.

Referring to FIG. 1 to FIG. 5, an embodiment of this application provides a battery module, including a battery 1, a plugging member 2, and a temperature collection assembly 3. The battery 1 includes a housing 13 and a cover plate 12 connected to the housing 13, where the cover plate 12 is provided with a temperature collection hole 121. The temperature collection hole 121 is, for example, a through hole, which not only implements temperature collection, but also may be used to inject electrolyte into the battery 1. The plugging member 2 includes an insertion portion 21, where the insertion portion 21 is installed in the temperature collection hole 121 and is configured to plug the temperature collection hole 121, and the insertion portion 21 is provided with an accommodating cavity 211 extending into an interior of the housing 13. The temperature collection assembly 3 includes a temperature collection portion 31, where the temperature collection portion 31 is installed inside the accommodating cavity 211.

The following describes in detail an optional structure of each component and a connection relationship between components.

Figure 2:
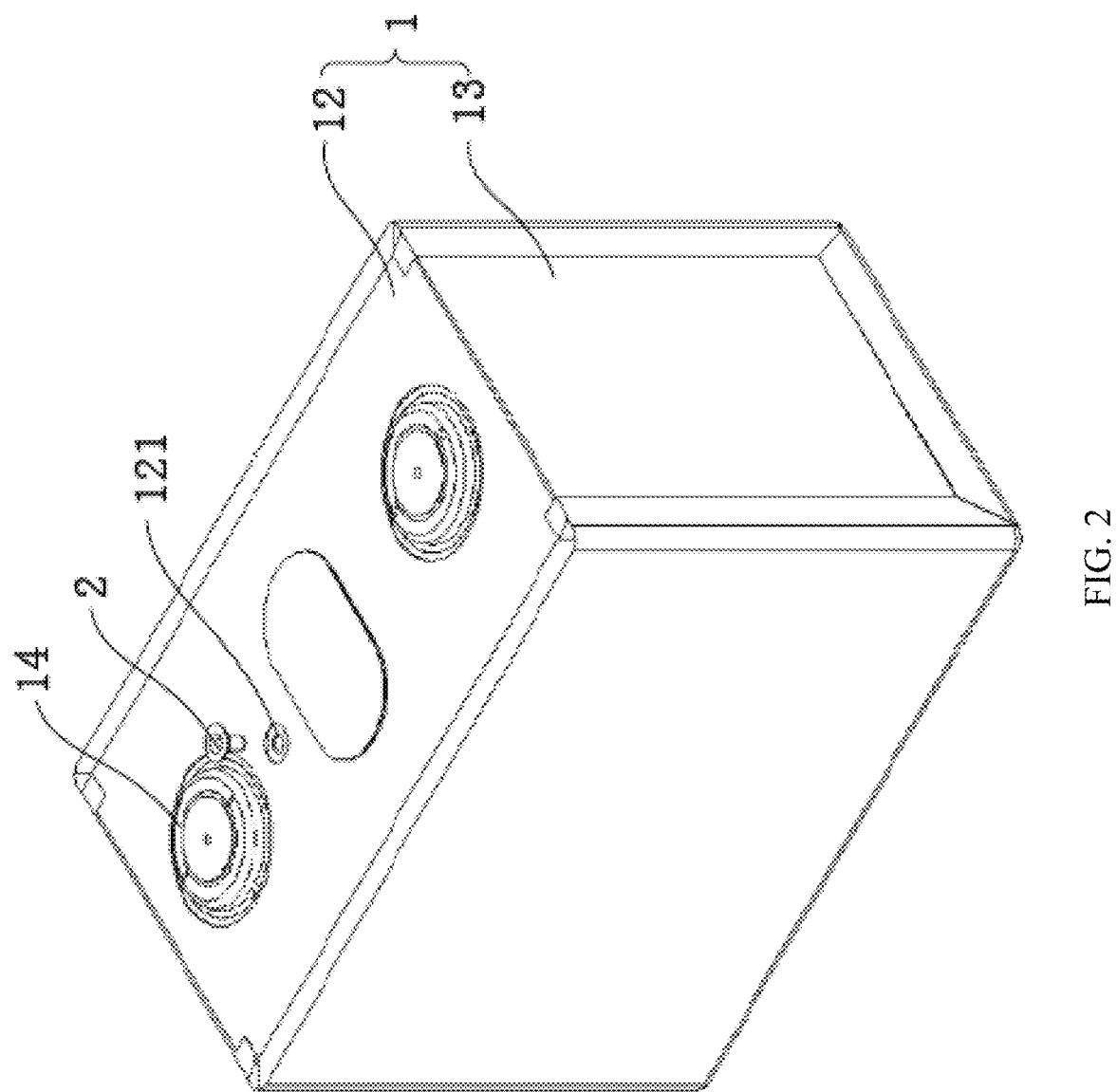
FIG. 2 is a schematic structural diagram of a plugging member, in an uninstalled state, of a battery module according to an embodiment of this application.

Referring to FIG. 2, an optional structure of the battery 1 is as follows: The battery 1 includes a housing 13, an electrode assembly (not shown in the figure) arranged inside the housing 13, a cover plate 12 arranged on the top of the electrode assembly, an electrode terminal 14 arranged on the cover plate 12, and a top patch (not shown in the figure) arranged on the top of the cover plate 12. In an implementation, the top patch is attached to the top of the cover plate 12. The cover plate 12 is provided with an explosion-proof hole, and an explosion-proof valve 15 is installed in the explosion-proof hole. The top patch is provided with a through hole that communicates with the temperature collection hole 121. The cover plate 12 is further provided with two electrode terminal through holes, and an electrode terminal 14 is installed in each electrode terminal through hole. The electrode terminal 14 includes a positive electrode terminal 141 and a negative electrode terminal 142.

One side of the housing 13 is closed and the other side is open. The cover plate 12 is arranged at an opening of the housing 13. The electrode assembly is installed inside the housing 13 through the opening. A largest side of the electrode assembly and a largest side of the housing 13 face each other, and the largest side of the housing 13 serves as a largest side of the battery 1.

A material of the top patch is, for example, an insulating material. The top patch is sheet-shaped, and a size of the top patch matches a size of a top surface of the cover plate 12. For example, the top patch has a structure and the size of just completely covering the top surface of the cover plate 12; or the size of the top patch is slightly larger than the size of the top surface of the cover plate 12, so that the top patch is big enough to form a bent edge to cover the cover plate 12.

On the one hand, the top patch plays an insulating role to prevent the cover plate 12 from being short-circuited with an external circuit. On the other hand, the top patch also plays a protection role for the cover plate 12 to prevent the cover plate 12 from being scratched.

Based on different manufacturing methods of the electrode assembly, the battery 1 is classified into a laminated battery and a spiral wound battery. The laminated battery is formed by cutting a positive electrode plate, a negative electrode plate, and a separator into a specified size and stacking the positive electrode plate, the separator, and the negative electrode plate. The spiral wound battery is formed by winding the positive electrode plate, the negative electrode plate, and the separator.

In the foregoing technical solution, the insertion portion 21 extends into an interior of the housing 13, and a position of the insertion portion 21 is very close to a position of the electrode assembly inside the battery 1. The insertion portion 21 may be even in contact with the electrode assembly. Therefore, the insertion portion 21 can accurately reflect a temperature inside the battery 1. A temperature collection process is implemented by transferring a temperature inside the battery 1 to the insertion portion 21 and then transferring the temperature by the insertion portion 21 to the temperature collection portion 31. The insertion portion 21 uses, for example, a metal or non-metal material with good thermal conductivity, specifically, for example, aluminum alloy.

Figure 4:
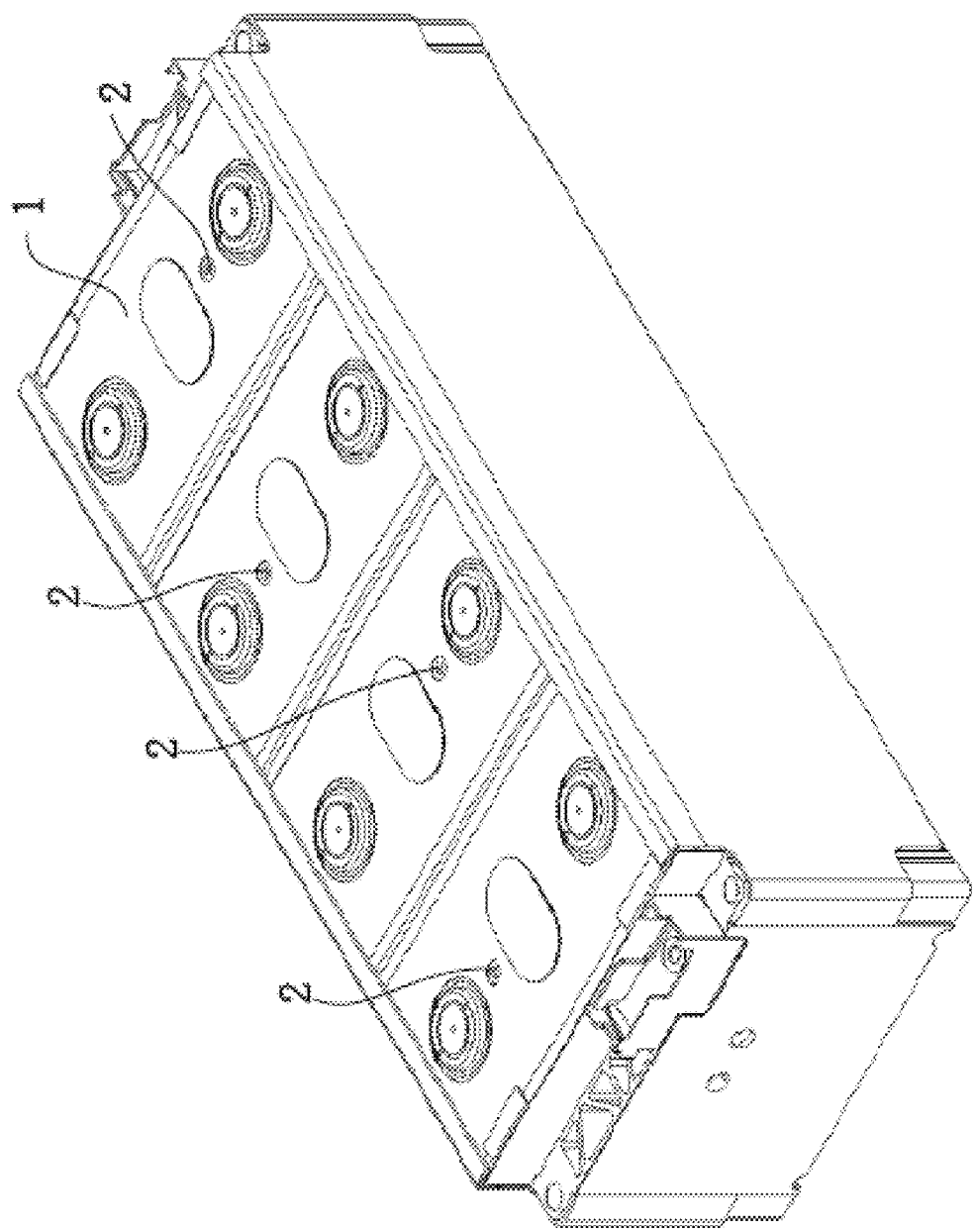
FIG. 4 is a schematic diagram of a structure of batteries of a battery module that are arranged in groups according to an embodiment of this application.

Referring to FIG. 4, the battery module includes a plurality of batteries 1 that are arranged in rows, and a wire harness board 4 described below is arranged on the top of one side on which the electrode terminals 14 of all the batteries 1 are located. An electrical connector is assembled on the wire harness board 4 to implement electrical connection of the plurality of batteries 1 and electrical connection of the battery module and another electrical component on a vehicle.

Referring to FIG. 2 to FIG. 6, the following describes a specific implementation of the plugging member 2.

The plugging member 2 is configured to plug the temperature collection hole 121 to seal an internal cavity of the housing 13 of the battery 1 from the outside. In view of this, the temperature collection hole 121 may alternatively be used as a liquid injection hole to inject electrolyte into the housing 13 through the temperature collection hole 121. Therefore, the temperature collection hole 121 communicates with the internal cavity of the housing 13. The insertion portion 21 of the plugging member 2 extends into the internal cavity of the housing 13. The insertion portion 21 is made of a metal or non-metal material with excellent thermal conductivity, to accurately reflect the temperature inside the battery 1.

Figure 6:
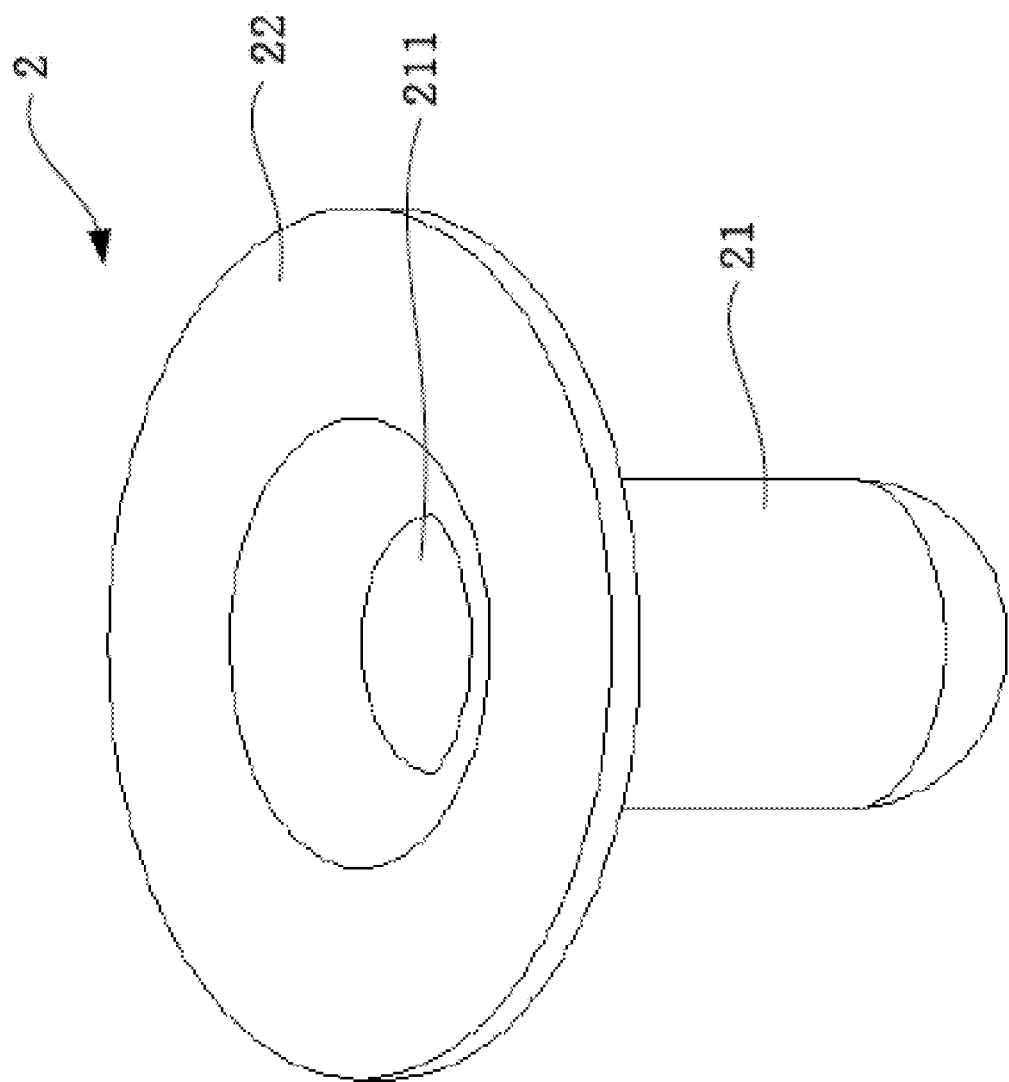
FIG. 6 is a schematic structural diagram of a plugging member of a battery module according to an embodiment of this application.
Figure 16:
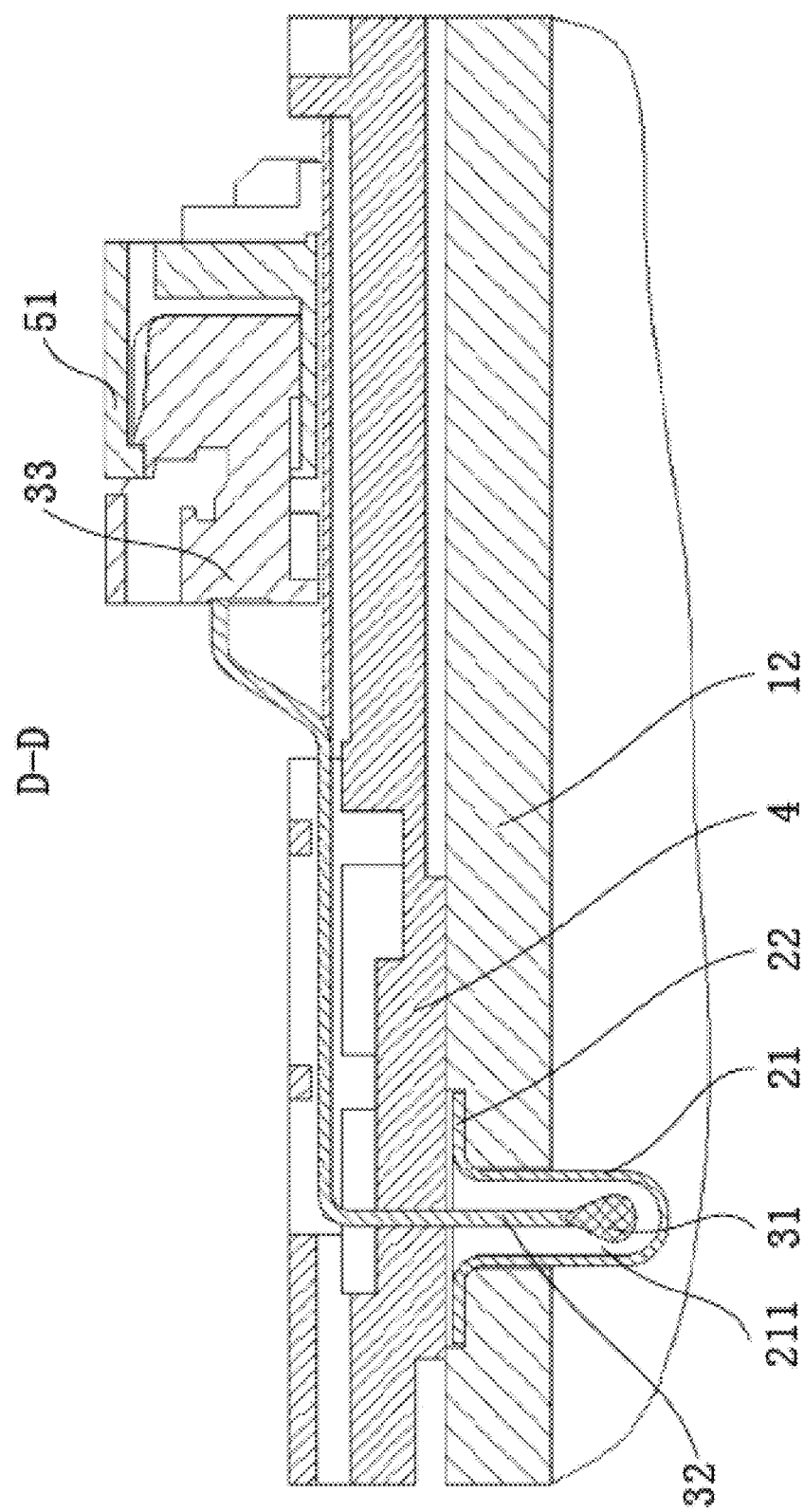
FIG. 16 is a schematic cross-sectional view taken along a line D-D in FIG. 15.
Figure 17:
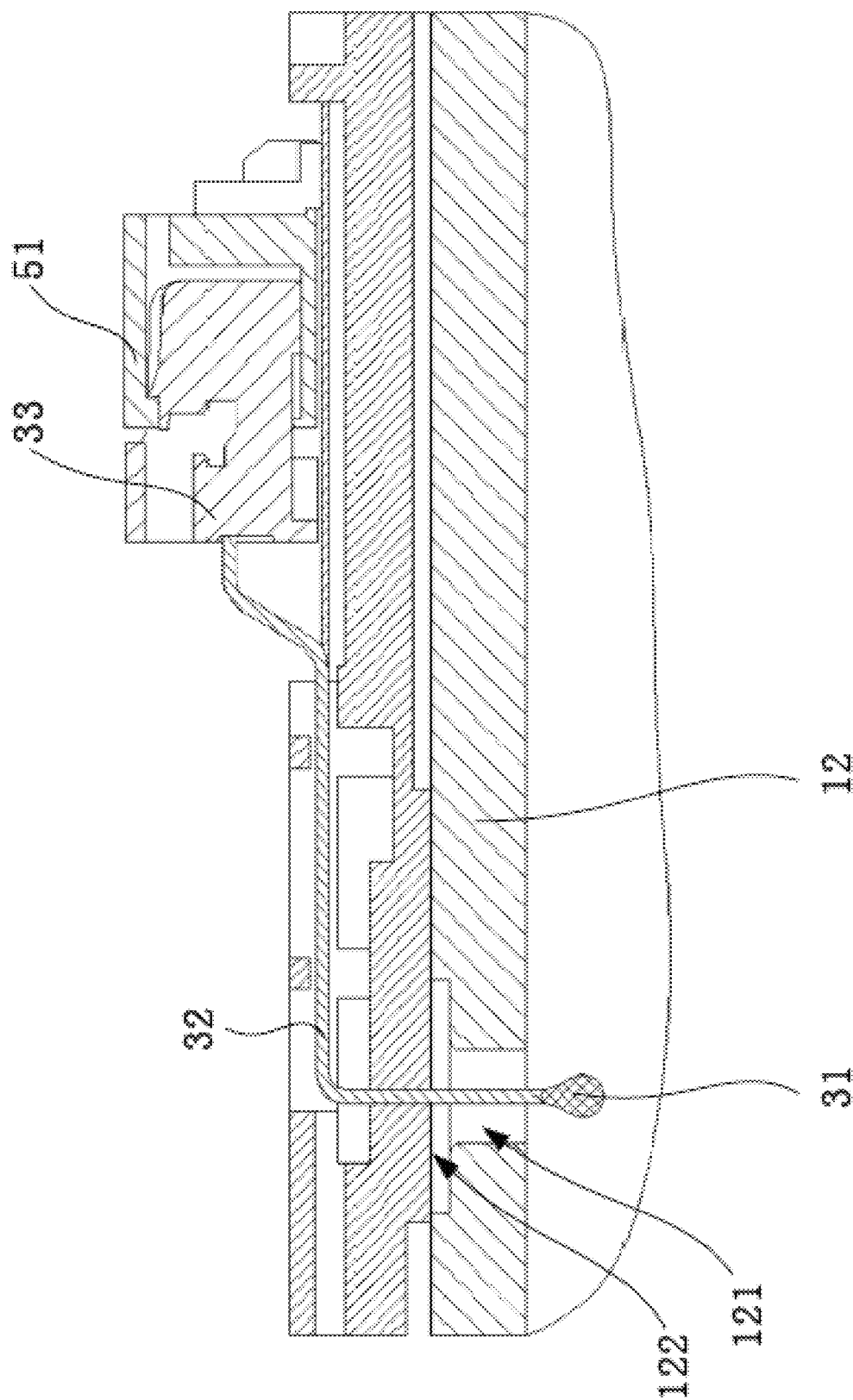
FIG. 17 is a schematic diagram of a structure with the plugging member removed in FIG. 16.

A structure of the plugging member 2 is shown in FIG. 6. The plugging member 2 includes the insertion portion 21, and the insertion portion 21 is substantially of a long strip shape. A cross-sectional shape of the long strip shape is, for example, circular, rectangular, or oval. As shown in FIG. 16 and FIG. 17, there may be a specific gap between an outer wall of the insertion portion 21 and an inner wall of the temperature collection hole 121. This gap enables the insertion portion 21 to be easily installed. A length of the portion of the insertion portion 21 that inserts into the interior of the housing 13 does not need to be too long, and the insertion portion 21 is not in contact with the electrode assembly inside the housing 13. Certainly, if necessary, the insertion portion 21 may alternatively be in contact with the electrode assembly. In some embodiments, an insertion depth of the insertion portion 21 preferably enables the temperature collection portion 31 of the temperature collection assembly 3 to be located inside the housing 13, as shown in FIG. 16. On the one hand, the insertion depth enables the temperature collection assembly 3 to accurately collect the temperature inside the housing 13. On the other hand, the insertion depth also prevents the insertion portion 21 from affecting normal working of the electrode assembly inside the housing 13 and ensures working performance of the battery 1.

Referring to FIG. 1 to FIG. 16, the following describes a structure and installation of the temperature collection assembly 3.

Figure 3:
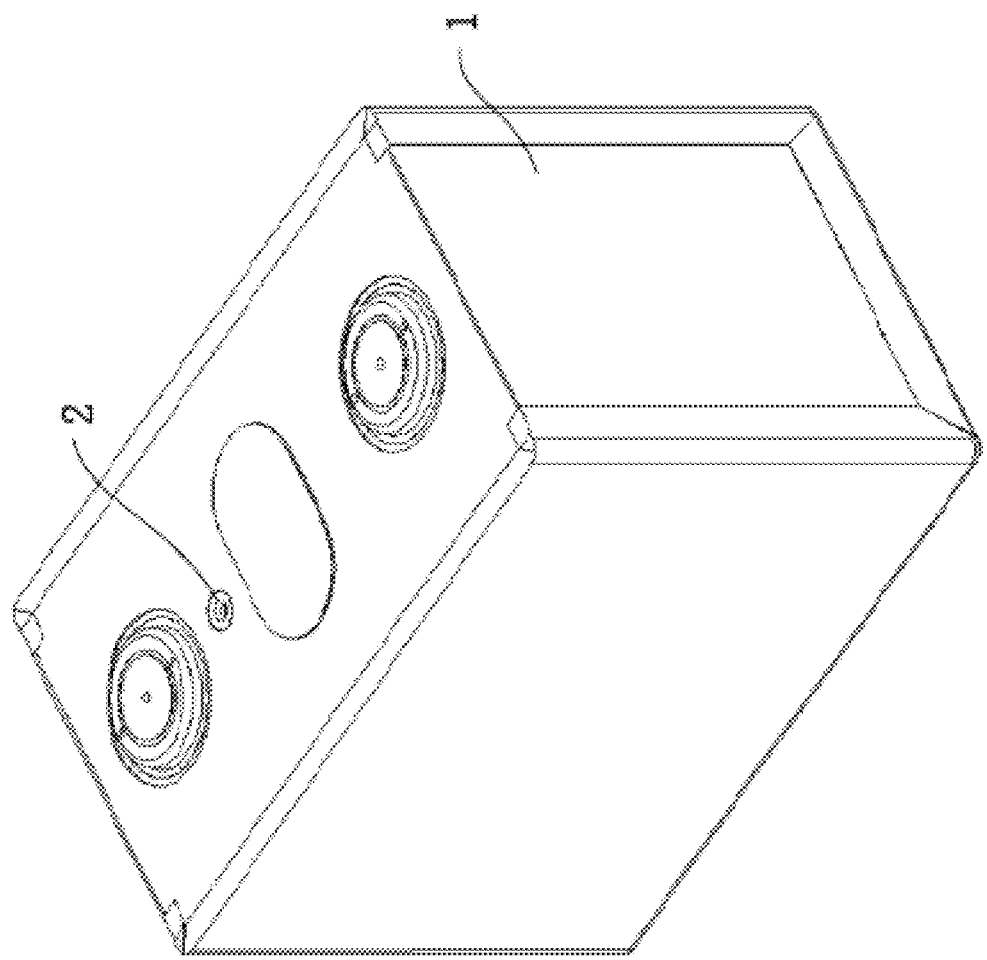
FIG. 3 is a schematic structural diagram of a battery, that does not have a plugging member installed, of a battery module according to an embodiment of this application.
Figure 5:
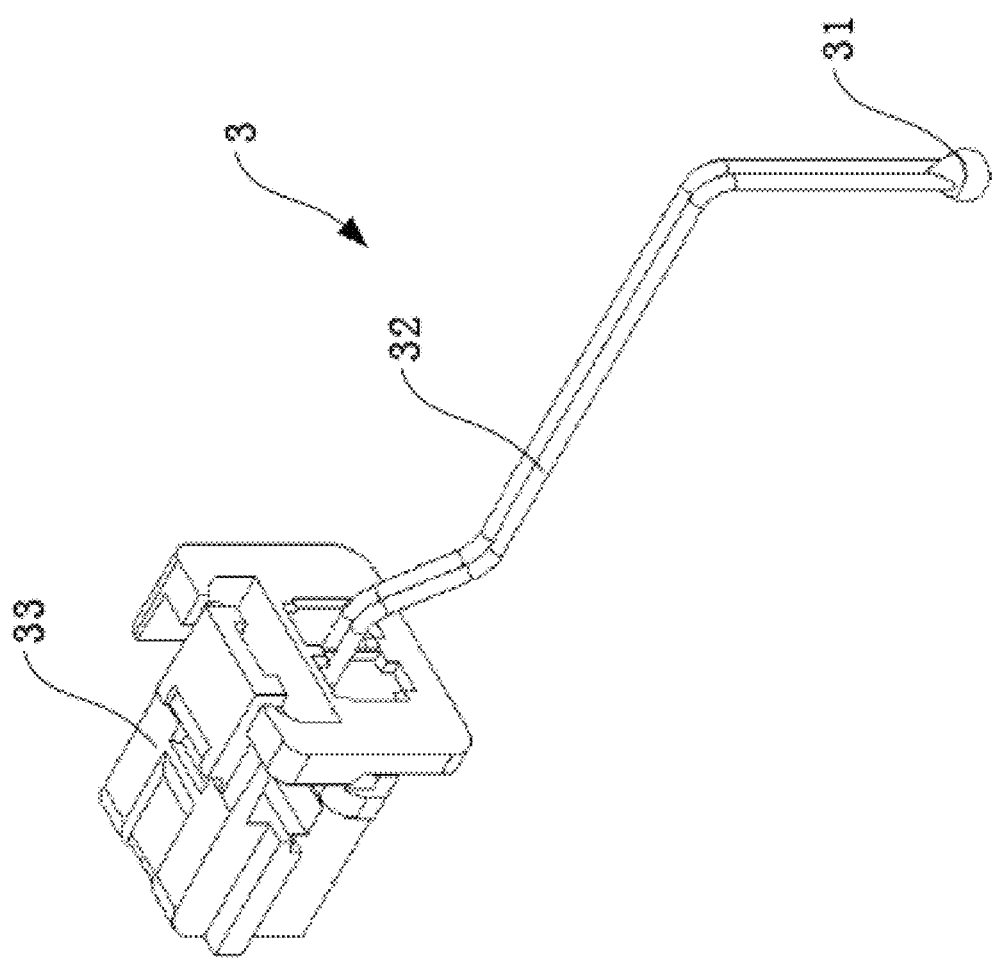
FIG. 5 is a schematic structural diagram of a temperature collection assembly of a battery module according to an embodiment of this application.
Figure 7:
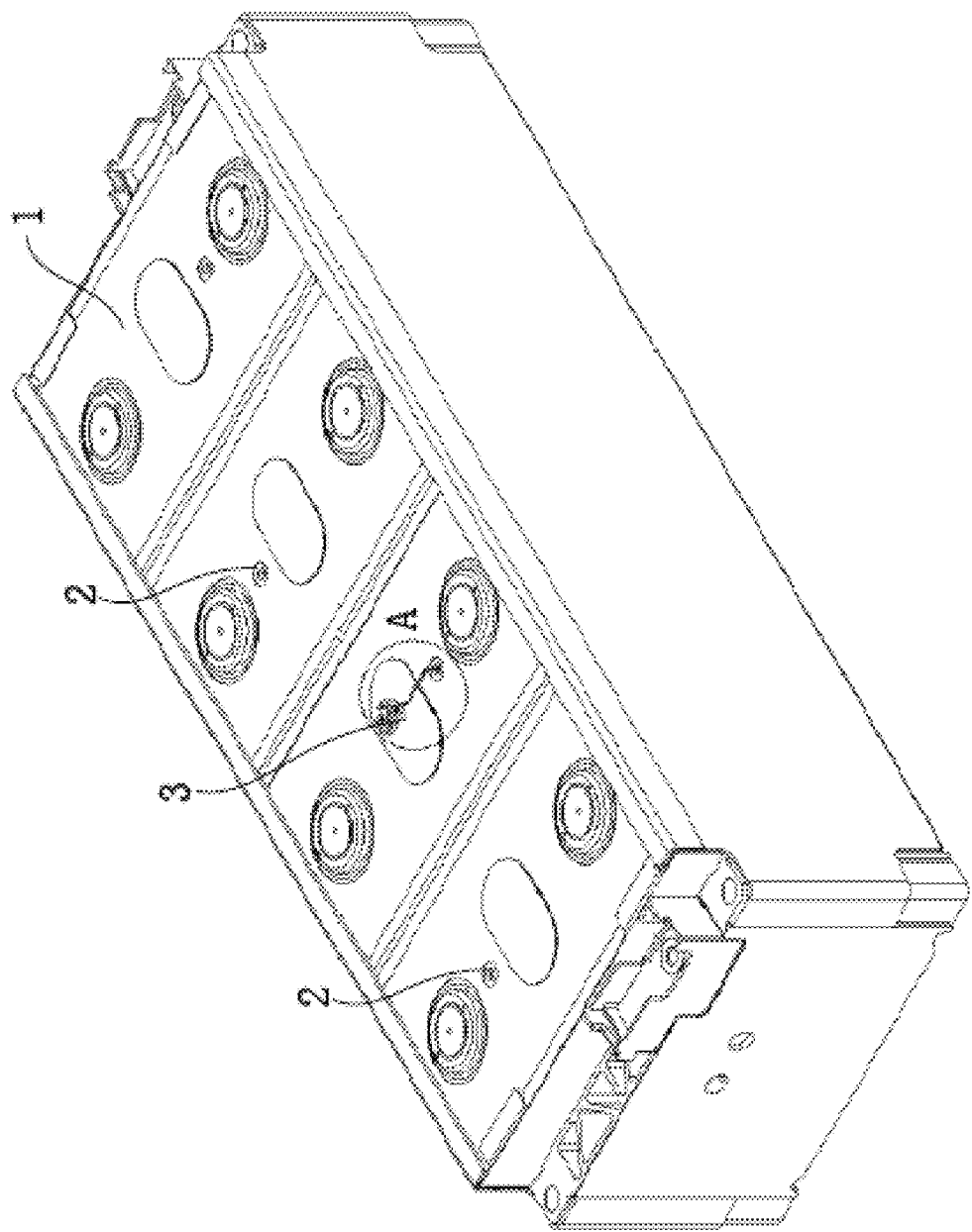
FIG. 7 is a schematic structural diagram of a temperature collection assembly, in an installed state, of a battery module according to an embodiment of this application.
Figure 8:
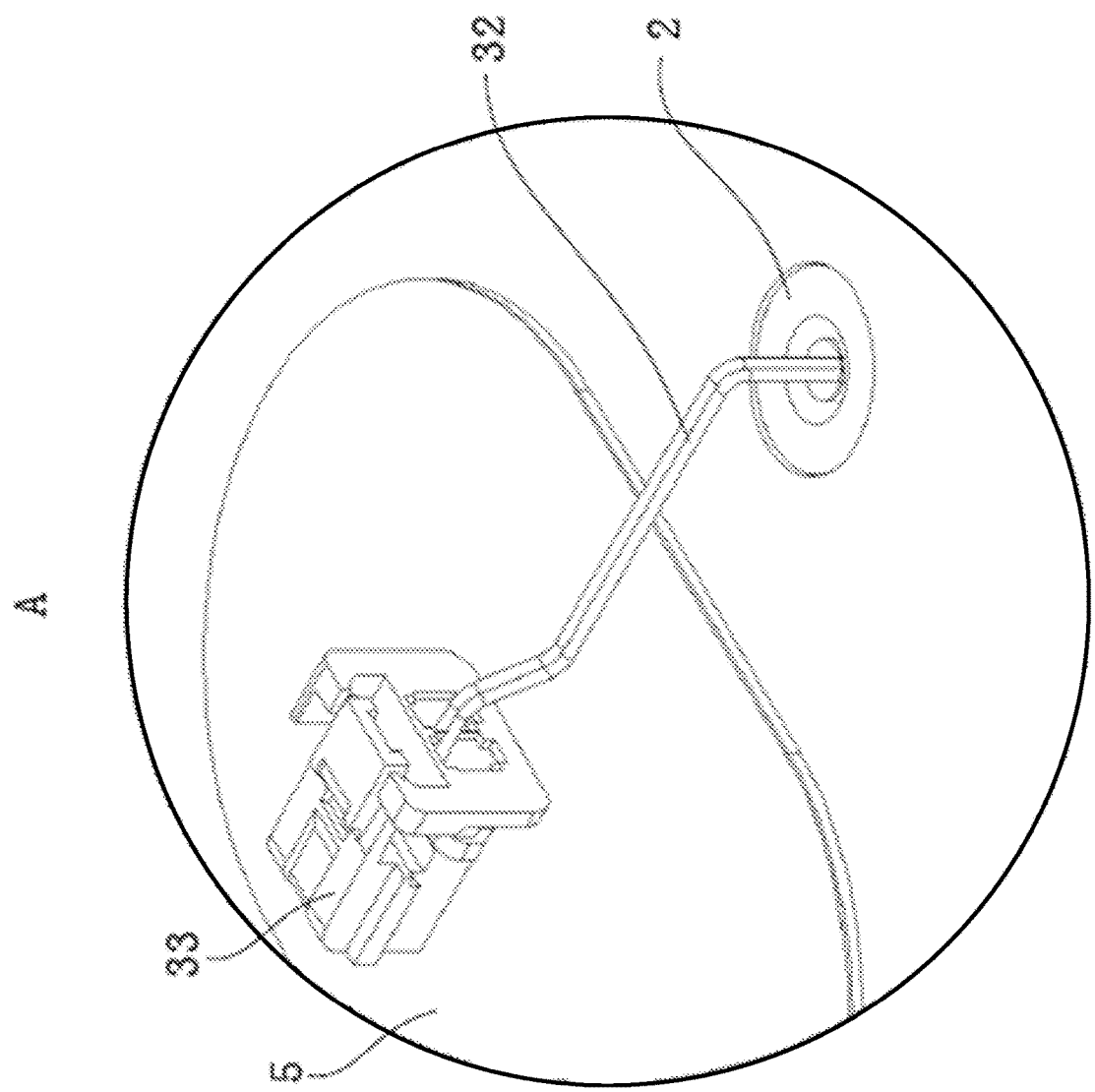
FIG. 8 is a locally enlarged schematic diagram of A in FIG. 7.

FIG. 1 illustrates an installation position of the temperature collection assembly 3, that is, a position at which the temperature collection hole 121 is located. FIG. 2 is a schematic diagram showing the plugging member 2 that is not installed in the temperature collection hole 121. The plugging member 2 is configured to install the temperature collection portion 31 of the temperature collection assembly 3. FIG. 3 is a schematic diagram showing a structure after the plugging member 2 is installed in the temperature collection hole 121. FIG. 4 is a schematic diagram showing a structure after a plurality of batteries 1 are installed and form a battery module. The plugging member 2 can be installed on each battery 1, or the plugging member 2 may be installed on only some of the batteries 1. FIG. 5 is a schematic diagram showing an optional structure of the temperature collection assembly 3. The following describes in detail a structure of each part of the temperature collection assembly 3 and an installation position relationship. FIG. 6 is a schematic diagram of a three-dimensional structure of the foregoing plugging member 2. FIG. 7 is a schematic diagram showing a three-dimensional structure of the battery module after the temperature collection assembly 3 is installed in the plugging member 2.

As shown in FIG. 6 and FIG. 16, the insertion portion 21 of the plugging member 2 has an accommodating cavity 211, and the accommodating cavity 211 is configured to place the temperature collection portion 31 of the temperature collection assembly 3. Because a large part or all of the accommodating cavity 211 is located inside the housing 13, a position of the temperature collection portion 31 is also basically located inside the housing 13, except that the temperature collection portion 31 is separated by a wall body of the accommodating cavity 211 and is not in contact with the electrode assembly inside the housing 13.

Referring to FIG. 5, the temperature collection portion 31 includes a thermistor. The temperature collection portion 31 may be a patch type NTC (Negative Temperature Coefficient, negative temperature coefficient) temperature sensor, or a water drop type NTC temperature sensor. If the patch type NTC temperature sensor is used, the accommodating cavity 211 needs to be large enough to satisfy an installation requirement of the patch type NTC temperature sensor. If the water drop type NTC temperature sensor is used, a water drop of the water drop type NTC temperature sensor is relatively small, and the accommodating cavity 211 is also slightly small. In the accompany drawings of the embodiments of this application, the water drop type NTC temperature sensor is used as an example.

Referring to FIG. 5 to FIG. 11, FIG. 16, and FIG. 17, the temperature collection assembly 3 further includes a wire 32. The wire 32 is electrically connected to the temperature collection portion 31. One end of the wire 32 is located inside the accommodating cavity 211, and the other end of the wire 32 is located outside the accommodating cavity 211.

The other end of the wire 32 is used to electrically connect to a connector plug 33 described below, to transfer a temperature collected by the temperature collection portion 31 to the connector plug 33 and then transfer the temperature to a circuit board 5. A length of the wire 32 is related to an installation position of the temperature collection portion 31 and a position where the wire 32 is electrically connected to the circuit board 5. In an implementation, the wire 32 is electrically connected to the circuit board 5, for example, in the following manner: An end of the wire 32 away from the temperature collection portion 31 is electrically connected to the connector plug 33, and a main body of the circuit board 5 is welded with a connector socket 51. The connector plug 33 is plugged into the connector socket 51 to implement the electrical connection between the wire 32 and the circuit board 5.

Existing products may be used as the connector plug 33 and the connector socket 51. For a schematic diagram of a connection between the connector plug 33 and the connector socket 51, refer to FIG. 11 to FIG. 14. Based on the foregoing connection manner, the electrical connection between the temperature collection portion 31 and the circuit board 5 is conveniently implemented. In addition, the electrical connection is reliable, installation is simple and efficient, and replacement is easy.

As shown in FIG. 6 and FIG. 16, the accommodating cavity 211 of the insertion portion 21 is open. The temperature collection portion 31 of the temperature collection assembly 3 is placed inside the accommodating cavity 211. There is a gap between the temperature collection portion 31 and an inner wall of the accommodating cavity 211. Thermal conductive sealant may be injected into the gap.

The thermal conductive sealant fixes the temperature collection portion 31 in the accommodating cavity 211. During installation, the temperature collection portion 31 and other components are first installed, and the sealant is then dispensed in the accommodating cavity 211, so that the temperature collection portion 31 is fixed to the inner wall of the accommodating cavity 211. The sealant can increase reliability of the fixed connection between the temperature collection portion 31 and the inner wall of the accommodating cavity 211, implement waterproof performance of the temperature collection portion 31, and prevent the temperature collection portion 31 from being damaged by water. In addition, because the temperature collection portion 31 is located inside the accommodating cavity 211, the inner wall of the accommodating cavity 211 restricts a flow area of the sealant to prevent the sealant from overflowing. Moreover, the accommodating cavity 211 accommodates and protects the temperature collection portion 31, prevents an external force from causing damage to the temperature collection portion 31, and ensures a temperature collection function of the temperature collection portion 31.

On the one hand, the thermal conductive sealant transfers the temperature from the wall body of the insertion portion 21 to the temperature collection portion 31. On the other hand, the thermal conductive sealant also fixes the position of the temperature collection portion 31 in the accommodating cavity 211, to prevent the temperature collection portion 31 from being displaced or even detached from the accommodating cavity 211 due to external forces, collisions, or the like, and to reduce or even avoid a case that the temperature collection portion 31 cannot collect a temperature or cannot accurately collect a temperature. In this way, the temperature collection portion 31 can still work normally when the temperature collection portion 31 suffers from expansion, deformation, shock, and vibration during charge and discharge.

The temperature collection portion 31 is electrically connected to one end of the wire 32, the other end of the wire 32 extends outside the accommodating cavity 211, and the other end of the wire 32 is plugged into the connector socket 51 of the circuit board 5 described above for the electrical connection.

Referring to FIG. 6 and FIG. 16, in some embodiments, an outer wall of the accommodating cavity 211 is in contact with or adjacent to the electrode assembly. Because the outer wall of the accommodating cavity 211 is very close to or even in contact with the electrode assembly, the outer wall of the accommodating cavity 211, that is, the wall body of the insertion portion 21, can sense a temperature of the electrode assembly, and remain a temperature basically consistent with the temperature of the electrode assembly. The temperature inside the housing 13 is transferred to the wall body of the accommodating cavity 211, and is transferred to the temperature collection portion 31 inside the accommodating cavity 211 through the wall body of the accommodating cavity 211. Then, the temperature collection portion 31 transmits a collected temperature signal to the wire 32 of the temperature collection assembly 3. Finally, the wire 32 transmits the temperature signal to the circuit board 5 outside to collect a temperature inside the battery 1.

In some embodiments, for example, if the plugging member 2 is made of a thermally conductive metal material, a material of the wall body of the accommodating cavity 211 is also thermally conductive. Therefore, the temperature inside the housing 13 can be transferred to the temperature collection portion 31 to implement temperature collection.

Figure 15:
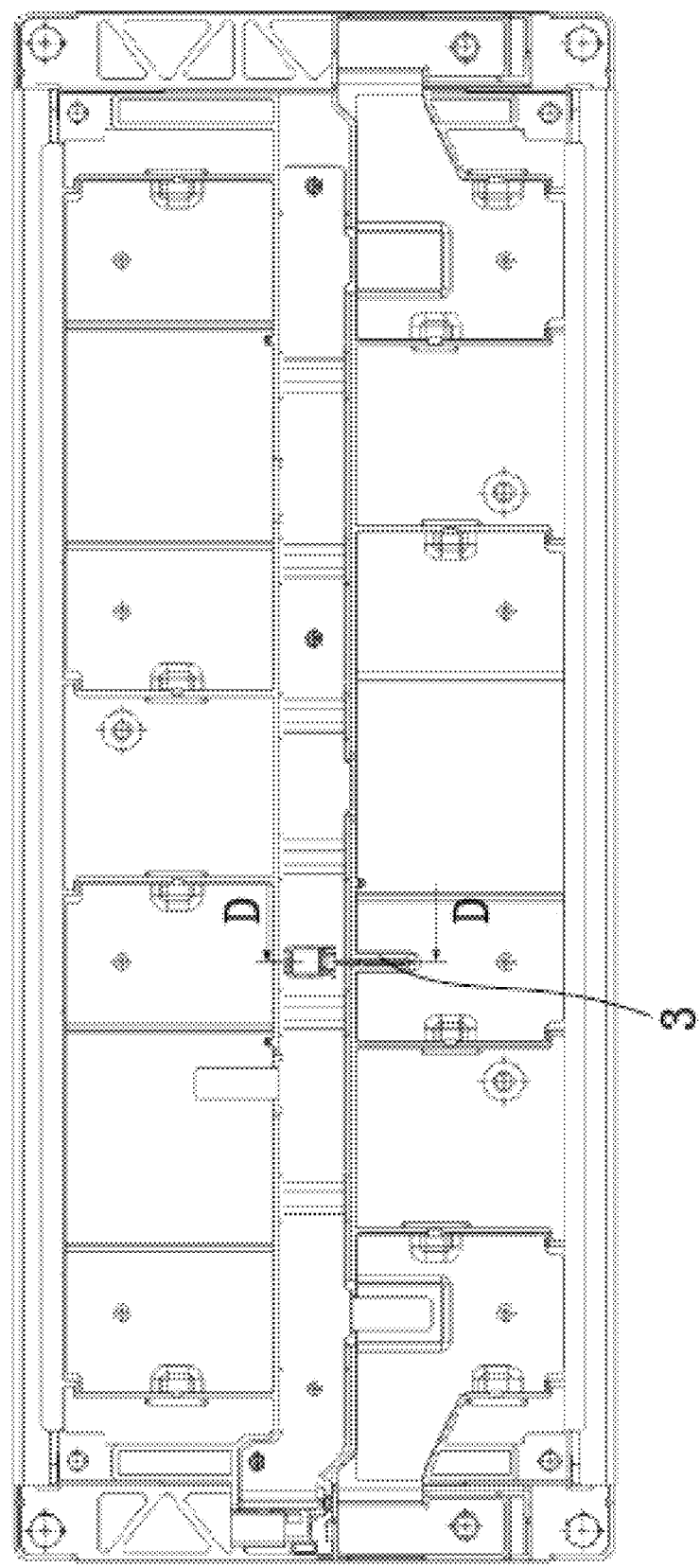
FIG. 15 is a schematic top view of FIG. 13.

Referring to FIG. 6, and FIG. 15 to FIG. 17, the following describes how the plugging member 2 is installed on the cover plate 12 of the battery 1. FIG. 15 is a schematic diagram showing a three-dimensional structure of the battery module after the temperature collection assembly 3 is installed. FIG. 16 is a partial cross-sectional view clearly showing the battery 1 where the temperature collection assembly 3 is located. FIG. 17 is a partial cross-sectional view clearly showing the battery 1 where the temperature collection assembly 3 is located after the plugging member 2 is removed.

The plugging member 2 is fixedly connected to the cover plate 12, for example, the plugging member 2 and the cover plate 12 are welded and fixed. After the battery 1 is assembled, a position of the plugging member 2 is determined, and the plugging member 2 is fixedly connected to the cover plate 12 of the battery 1. The connection is reliable. During working of the battery module, even if a working condition is relatively bad, the plugging member 2 can still be firmly installed on the cover plate 12, and is not prone to fall off and misplace. In addition, the plugging member 2 serves as an installation structure of the temperature collection portion 31 of the temperature collection assembly 3. If the position of the plugging member 2 is fixed, the installation position of the temperature collection portion 31 is also fixed.

Referring to FIG. 16 and FIG. 17, in some embodiments, the plugging member 2 further includes a sealing portion 22. The sealing portion 22 is arranged at an end of the insertion portion 21 that is close to the cover plate 12. The sealing portion 22 is clamped in a peripheral area of the temperature collection hole 121. The sealing portion 22 is welded to the cover plate 12. The peripheral area of the temperature collection hole 121 is an opening edge area of the temperature collection hole 121, and this area is used to implement connection and cooperation between the sealing portion 22 and the temperature collection hole 121, so that the plugging member 2 can seal the temperature collection hole 121. The sealing portion 22 is used as a connection component of the plugging member 2 and the cover plate 12. To ensure a better connection effect and sealing effect, in an implementation, the sealing portion 22 has a surface that is attached to the cover plate 12, and a shape of the surface matches a shape of a corresponding position of the cover plate 12. For example, the sealing portion 22 has a surface-to-surface fit with the cover plate 12, so that there is a larger contact area between the sealing portion 22 and the cover plate 12.

The sealing portion 22 is made of a material that can conduct heat. A temperature collected by the temperature collection assembly 3 comes from two paths. One is that a temperature is transferred to the temperature collection portion 31 through the wall body of the accommodating cavity 211. The other is that a temperature transferred through the cover plate 12 of the battery 1 to the sealing portion 22, then to the insertion portion 21, and finally to the temperature collection portion 31. The foregoing technical solution has two temperature transfer paths. The temperature collected by the temperature collection assembly 3 can more accurately reflect the temperature inside the battery 1. In addition, the components are small in quantity and size, a transfer path is short, and a response speed is fast.

Still referring to FIG. 16 and FIG. 17, in some embodiments, the cover plate 12 is provided with a sink groove 122, and the sealing portion 22 is installed in the sink groove 122. A surface of the sealing portion 22 away from the sink groove 122 is flush with a surface of the cover plate 12 away from the electrode assembly, or a surface of the sealing portion 22 away from the sink groove 122 is below a surface of the cover plate 12 away from the electrode assembly, to prevent the sealing portion 22 from affecting installation of another component above the cover plate 12.

The sink groove 122 is provided so that after the plugging member 2 is installed, an upper surface of the plugging member 2 does not protrude from a top surface of the cover plate 12 after the plugging member 2 is installed in the temperature collection hole 121. This prevents the plugging member 2 from affecting the installation of other components such as the wire harness board 4.

Referring to FIG. 6, in some embodiments, the sealing portion 22 is annular and is integral with the insertion portion 21. The sealing portion 22 uses the foregoing annular structure, the entire sealing portion 22 is in contact with a bottom surface of the sink groove 122, and the entire sealing portion 22 can receive a temperature from the bottom surface of the sink groove 122. A temperature collection area of the sealing portion 22 is large. In addition, a temperature collected by the sealing portion 22 is transferred to the temperature collection portion 31 subsequently through the thermal conductive sealant. In this way, the temperature collected by the temperature collection portion 31 is more accurate, and the temperature inside the housing 13 of the battery 1 can be more accurately and timely reflected.

Referring to FIG. 9 to FIG. 11 and FIG. 16, in some embodiments, the battery module further includes a wire harness board 4. The wire harness board 4 is installed on the side of the cover plate 12 away from the electrode assembly, to be specific, the wire harness board 4 is installed on the top side of the cover plate 12. The wire harness board 4 is provided with a buckle 41, and the buckle 41 clamps the wire 32 between the temperature collection portion 31 and the connector plug 33. The buckle 41 makes a position of a middle section of the wire 32 relatively fixed. This prevents the wire 32 from shaking freely and causing the temperature collection portion 31 and the connector plug 33 to fall off, and also prevents the wire 32 from lifting upwards and interfering with or affecting installation of another component. In addition, the buckle 41 makes the installation of the temperature collection assembly 3 more reliable. In this way, stability and long-term reliability of the temperature collection assembly 3 can be improved, and reliability of the connection between the temperature collection assembly 3 and plugging member 2 can be increased under various shock or vibration conditions. It should be noted that the wire 32 extends from a bottom of the wire harness board 4 to a position, at which the circuit board 5 is located, on the top of the wire harness board 4. This not only shortens a length of the wire 32, but also makes installation of the wire 32 easier and a structure of the battery module more compact. The wire harness board 4 may be provided with a bypass hole to allow the wire 32 to pass through.

Figure 9:
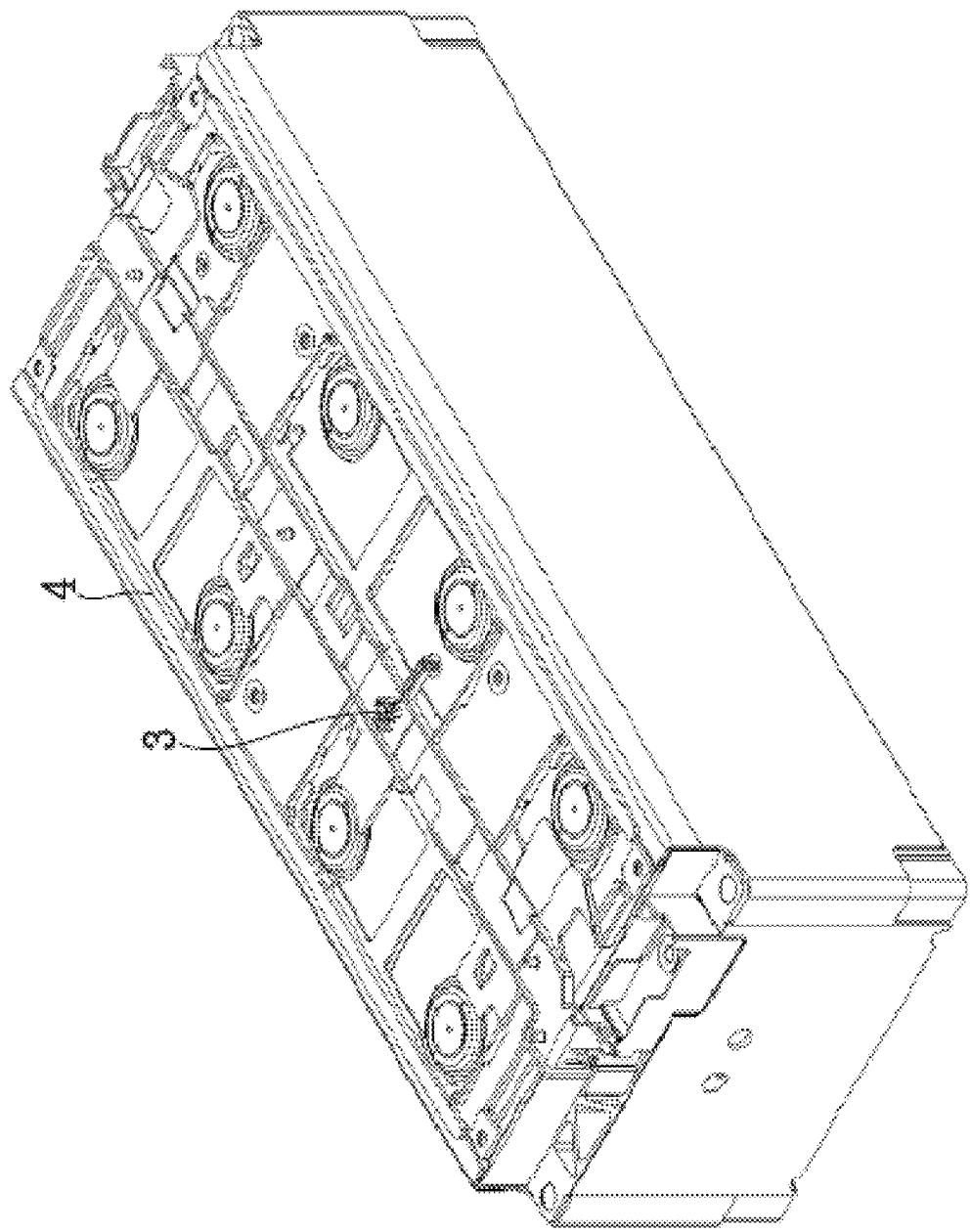
FIG. 9 is a schematic structural diagram of a battery module that has a wire harness board installed according to an embodiment of this application.
Figure 10:
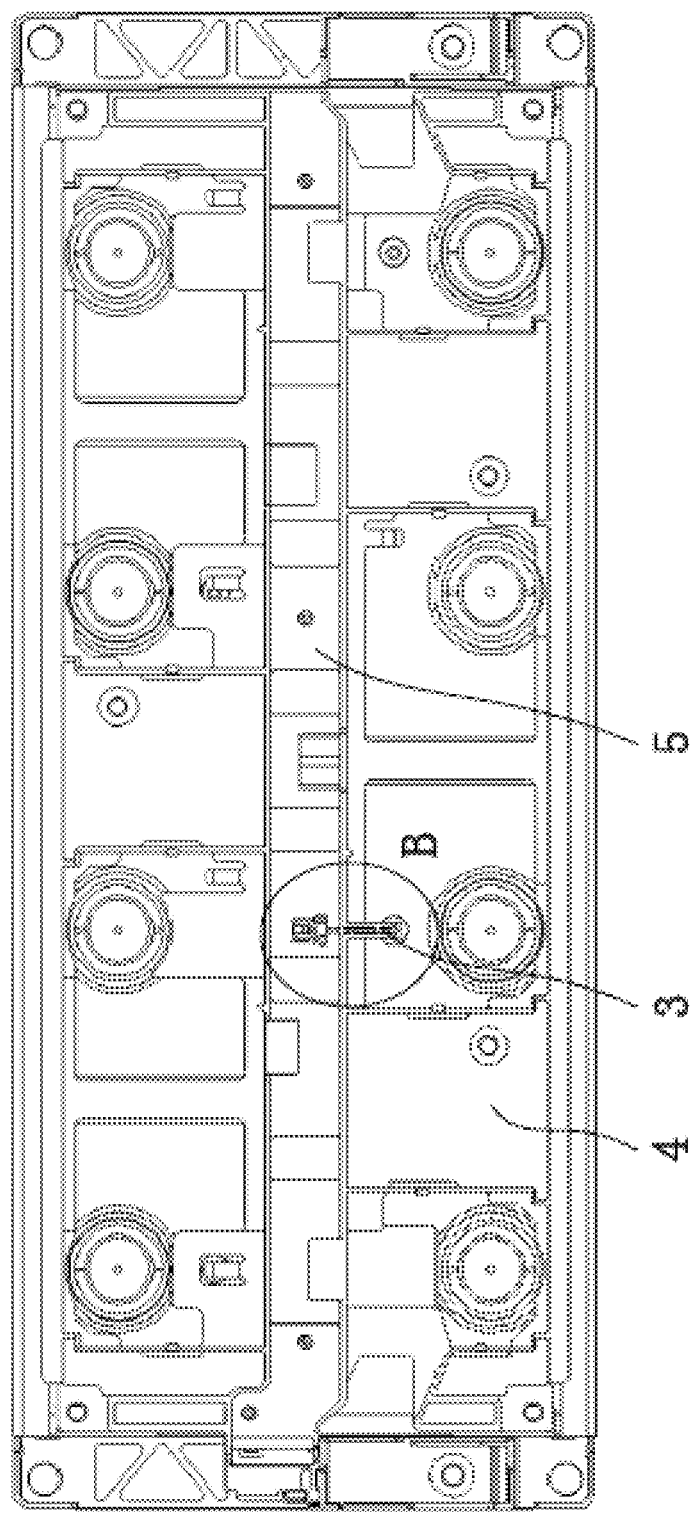
FIG. 10 is a schematic top view of FIG. 9.
Figure 11:
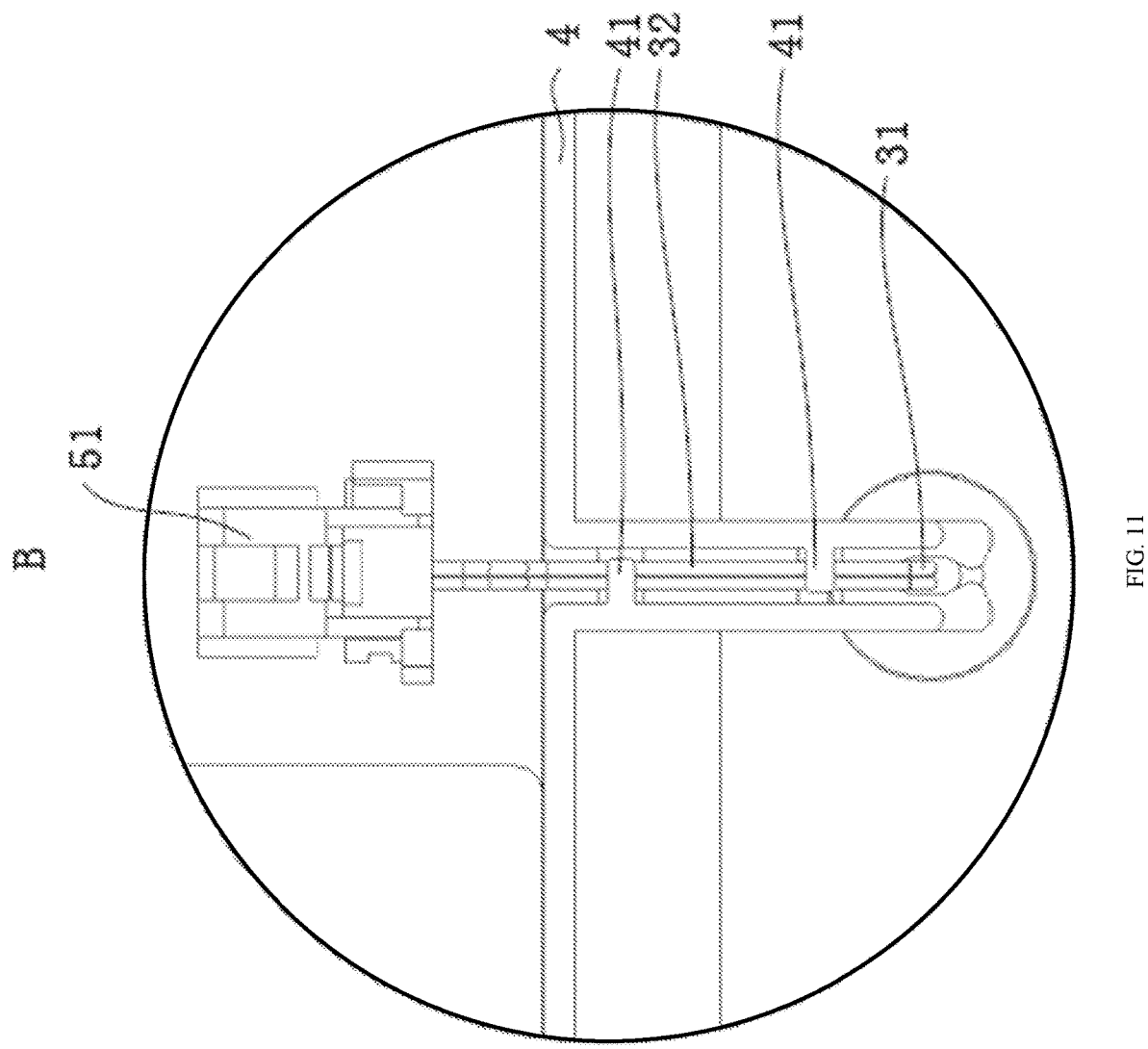
FIG. 11 is a locally enlarged schematic diagram of B in FIG. 10.
Figure 12:
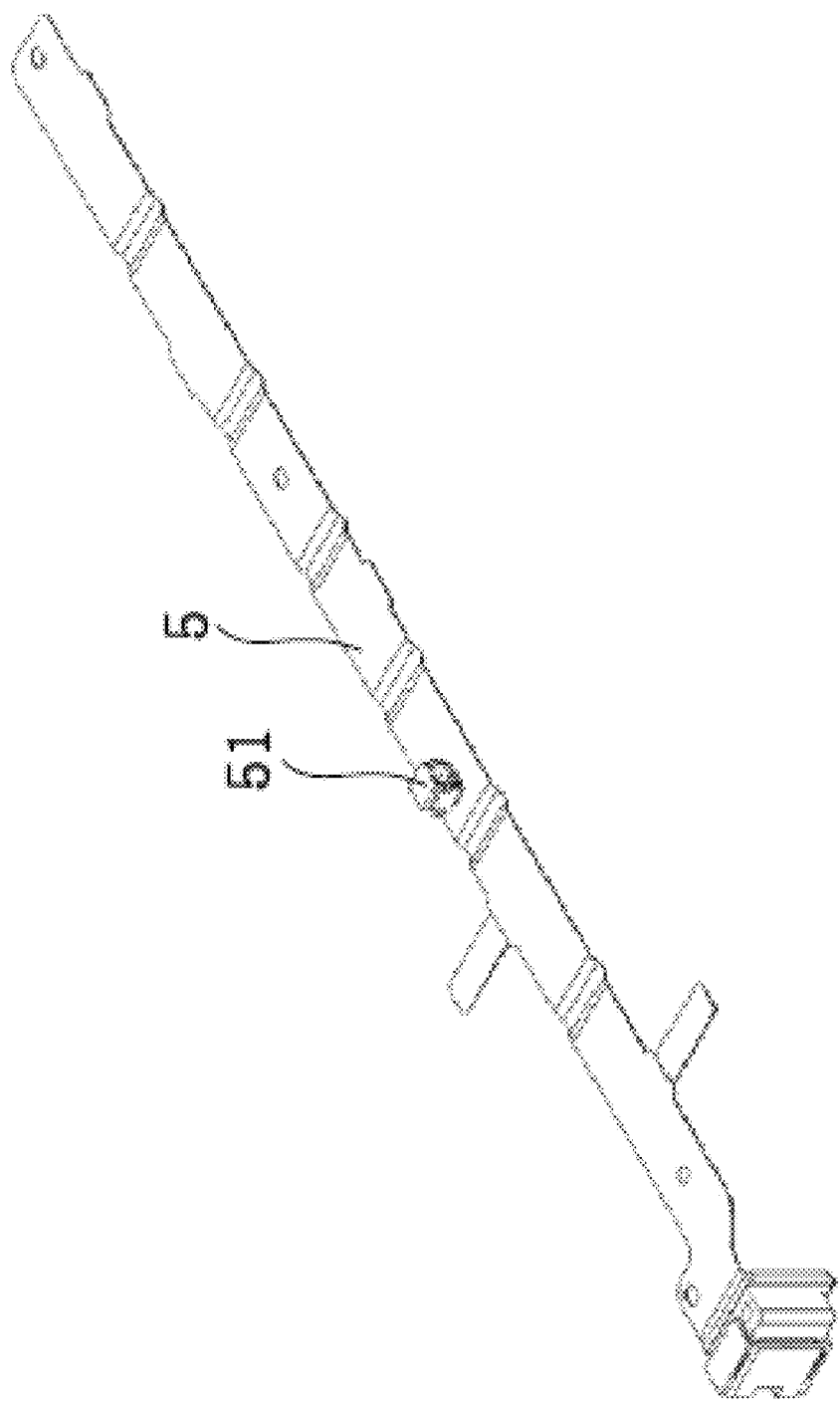
FIG. 12 is a schematic structural diagram of a circuit board of a battery module according to an embodiment of this application.

Referring to FIG. 9 and FIG. 10, in some embodiments, the battery module further includes a circuit board 5. The circuit board 5 is, for example, a flexible printed circuit board (Flexible Printed Circuit Board, FPC for short) or a printed circuit board (Printed Circuit Board, PCB for short). The PCB has higher rigidity and higher hardness; and the FPC board has higher flexibility and lower hardness. The circuit board 5 is, for example, of a long strip shape. The circuit board 5 is located in a middle area of the wire harness board 4.

In some embodiments, the circuit board 5 includes a connector socket 51. The temperature collection assembly 3 includes a connector plug 33. The connector plug 33 is electrically connected to an end of the wire 32 away from the temperature collection portion 31. The connector socket 51 is electrically connected to the circuit board 5. The connector socket 51 is electrically connected to the connector plug 33.

The circuit board 5 collects a temperature collected by the temperature collection portion 31 through the connector socket 51 and the connector plug 33.

Referring to FIG. 7, there are two or more batteries 1, and the batteries are arranged in rows. The temperature collection assembly 3 is connected to at least one of batteries 1 that are electrically connected in a row.

Figure 13:
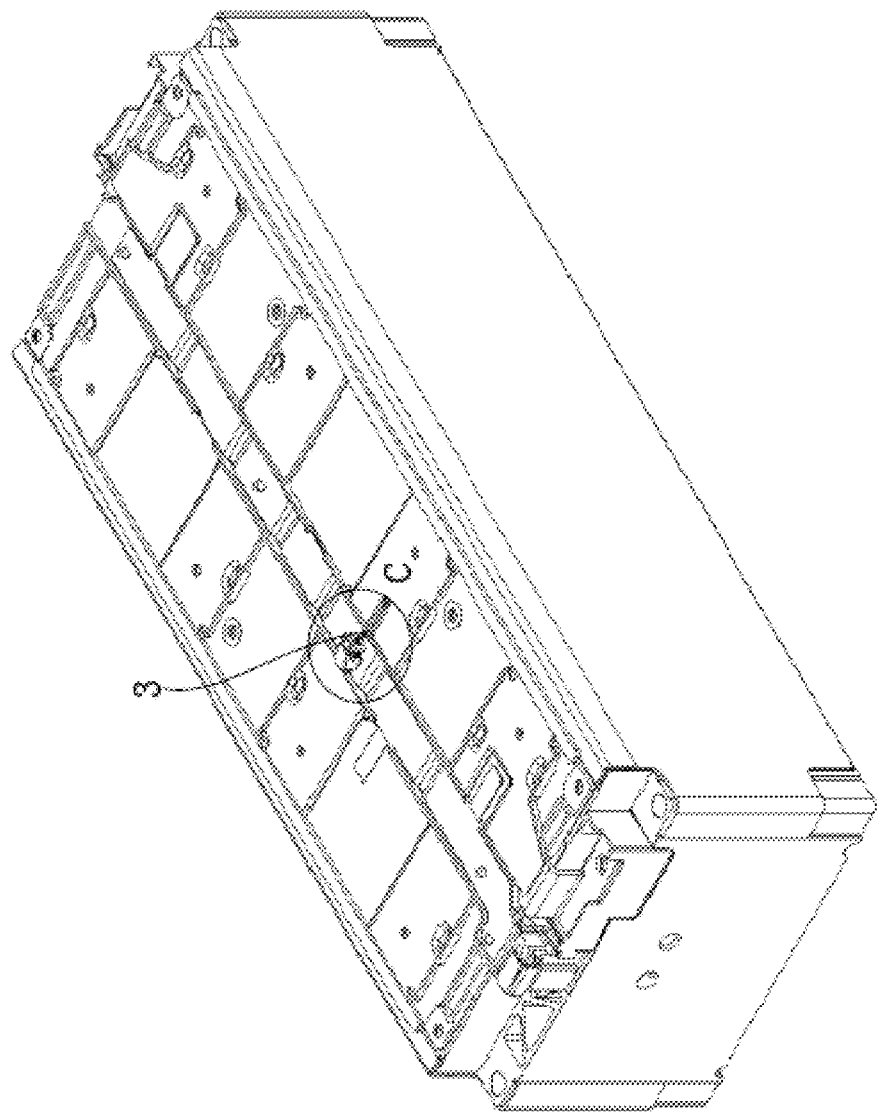
FIG. 13 is a schematic structural diagram of a battery module that has a circuit board installed according to an embodiment of this application.
Figure 14:
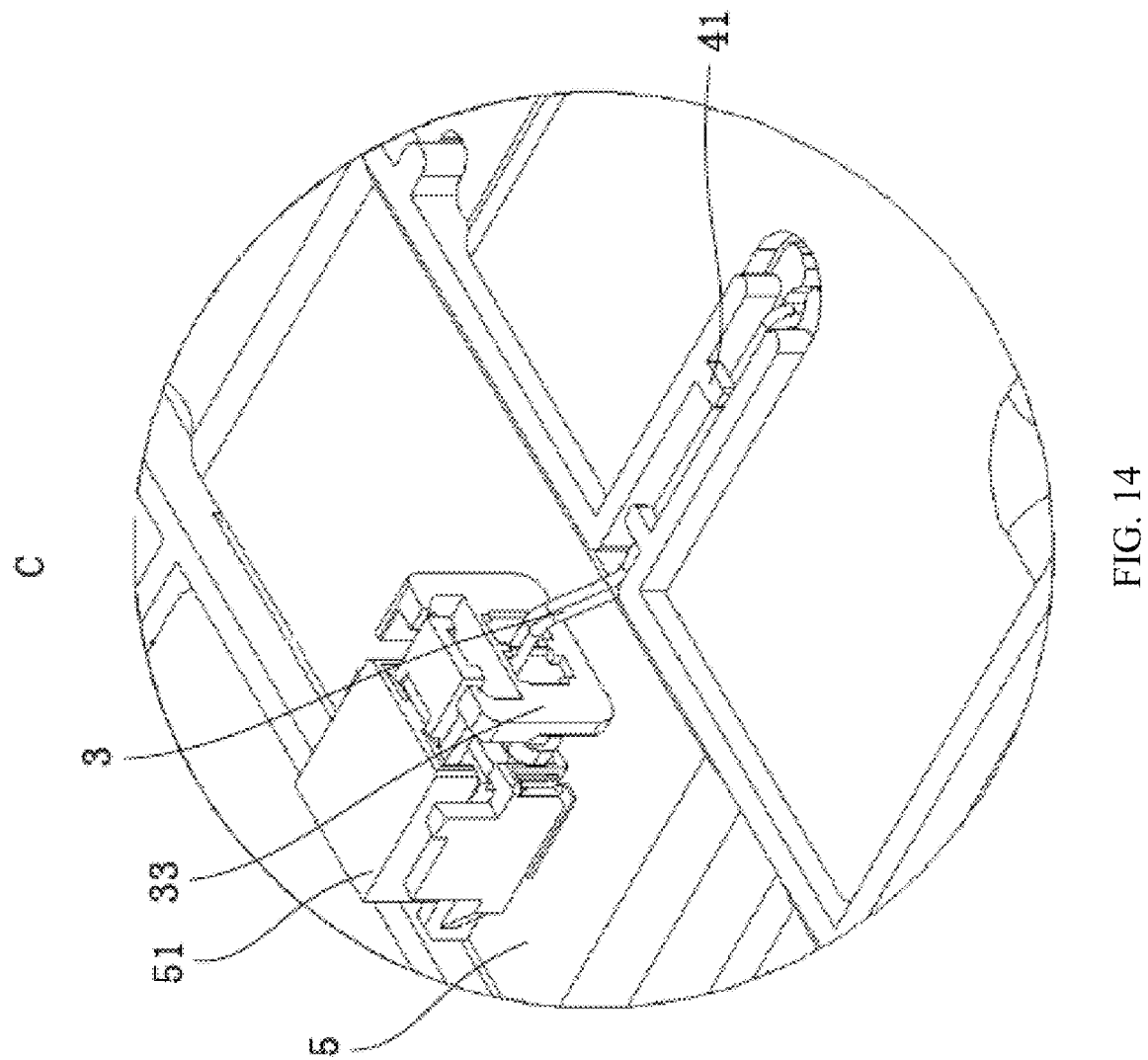
FIG. 14 is a locally enlarged schematic diagram of C in FIG. 13.

Referring to FIG. 13 to FIG. 15, the following describes an installation process of the temperature collection assembly 3.

After the battery module is assembled to a semi-finished product, the temperature collection portion 31 is installed in the accommodating cavity 211. Then, the thermal conductive sealant is dispensed to the inner wall of the accommodating cavity 211, so that the temperature collection portion 31 is firmly installed in the accommodating cavity 211.

Then, the wire harness board 4 is installed on the top of the cover plate 12 of the battery 1. The position of the wire 32 of the temperature collection assembly 3 should be considered during installation of the wire harness board 4. The other end of the wire 32, that is, an end of the wire 32 that is connected to the connector plug 33, needs to be located on an outer side of the wire harness board 4, so that the connector plug 33 can be easily electrically connected to the connector socket 51 subsequently.

Finally, the circuit board 5 is installed on the wire harness board 4, and the connector plug 33 connected to the temperature collection portion 31 is plugged into the connector socket 51 on the circuit board 5, so that the temperature collection portion 31 is electrically connected to the circuit board 5, and a temperature signal inside the battery 1 that is collected by the temperature collection portion 31 can be transferred to the circuit board 5.

In the battery module provided in the foregoing technical solution, the temperature inside the housing 13 is transferred to the temperature collection portion 31 of the temperature collection assembly 3 through a short transfer path. In this way, a temperature transfer response is fast, a temperature loss is low, and a measurement result is accurate. In addition, the insertion portion 21 of the plugging member 2 extends into the interior of the housing 13, and the insertion portion 21 can accurately sense a temperature inside the housing 13 of the battery 1. A temperature of the wall body of the insertion portion 21 is basically the same as the temperature inside the battery 1. A temperature collected by the temperature collection portion 31 basically accurately reflects the temperature inside the battery 1. In addition, a temperature transfer path is short, and temperature changes inside the battery 1 can also be reflected as temperature changes of the insertion portion 21 in a timely manner, so that the temperature collected by the temperature collection portion 31 also changes in a timely manner. This provides accurate temperature data for subsequent processing of the circuit board 5, makes control more accurate, and effectively reduces or even prevents occurrence of discharge power limitation performed by the battery module in advance.

In addition, an embodiment of this application further provides a vehicle including the foregoing battery module.

In the descriptions of this application, it should be understood that the orientations or positional relationships indicated by the terms "center", "vertical", "transverse", "front", "rear", "left", "right", "perpendicular", "horizontal", "top", "bottom", "inside", "outside", and the like are based on the orientations or positional relationships shown in the accompanying drawings, are merely intended to facilitate the descriptions of this application and simplify the descriptions, are not intended to indicate or imply that the apparatuses or components mentioned in this application must have specific orientations, or be constructed and operated for a specific orientation, and therefore shall not be construed as a limitation to the content protected by this application.

In conclusion, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A battery module, comprising:
   a battery, comprising a housing and a cover plate connected to the housing, wherein the cover plate is provided with a temperature collection hole;
   a plugging member, comprising an insertion portion, wherein the insertion portion is installed in the temperature collection hole, and the insertion portion is provided with an accommodating cavity extending into an interior of the housing; and
   a temperature collection assembly, comprising a temperature collection portion, wherein the temperature collection portion is installed inside the accommodating cavity; and, wherein the temperature collection assembly further comprises:
   a wire, electrically connected to the temperature collection portion, wherein one end of the wire is located inside the accommodating cavity, and the other end of the wire is located outside the accommodating cavity; and
   a connector plug electrically connected to the other end of the wire and is located on the cover plate.

2. The battery module according to claim 1, wherein an outer wall of the insertion portion is adjacent to an electrode assembly inside the housing.

3. The battery module according to claim 1, wherein an outer wall of the insertion portion is in contact with an electrode assembly inside the housing.

4. The battery module according to claim 1, wherein thermal conductive sealant is provided between the temperature collection portion and an inner wall of the accommodating cavity.

5. The battery module according to claim 1, wherein the plugging member further comprises:
   a sealing portion, arranged at an end of the insertion portion that is close to the cover plate, wherein the sealing portion is clamped in a peripheral area of the temperature collection hole.

6. The battery module according to claim 5, wherein the cover plate is provided with a sink groove that communicates with the temperature collection hole, and the sealing portion is installed in the sink groove.

7. The battery module according to claim 5, wherein the sealing portion is annular and integral with the insertion portion.

8. The battery module according to claim 1, further comprising:
   a wire harness board, installed on the top of the cover plate, wherein the wire harness board is provided with a buckle, and the buckle is connected to the wire.

9. The battery module according to claim 1, further comprising a circuit board, wherein the circuit board is arranged on the top of the cover plate, and the circuit board comprises a connector socket; and, wherein
   the connector plug is electrically connected to the connector socket.

10. The battery module according to claim 1, further comprising two or more batteries arranged in rows; and the temperature collection portion is installed on at least one of the batteries.

11. A vehicle, comprising a battery module, the battery module comprising:
    a battery, comprising a housing and a cover plate connected to the housing, wherein the cover plate is provided with a temperature collection hole;
    a plugging member, comprising an insertion portion, wherein the insertion portion is installed in the temperature collection hole, and the insertion portion is provided with an accommodating cavity extending into an interior of the housing; and
    a temperature collection assembly, comprising a temperature collection portion, wherein the temperature collection portion is installed inside the accommodating cavity; and, wherein the temperature collection assembly further comprises:
    a wire, electrically connected to the temperature collection portion, wherein one end of the wire is located inside the accommodating cavity, and the other end of the wire is located outside the accommodating cavity; and a connector plug electrically connected to the other end of the wire and is located above the cover plate.

12. The vehicle according to claim 11, wherein an outer wall of the insertion portion is at least adjacent to an electrode assembly inside the housing.

13. The vehicle according to claim 11, wherein thermal conductive sealant is provided between the temperature collection portion and an inner wall of the accommodating cavity.

14. The vehicle according to claim 11, wherein the plugging member further comprises:

a sealing portion, arranged at an end of the insertion portion that is close to the cover plate, wherein the sealing portion is clamped in a peripheral area of the temperature collection hole.

15. The vehicle according to claim 14, wherein the cover plate is provided with a sink groove that communicates with the temperature collection hole, and the sealing portion is installed in the sink groove.

16. The vehicle according to claim 14, wherein the sealing portion is annular and integral with the insertion portion.

17. The vehicle according to claim 11, wherein the battery module further comprises:

a wire harness board, installed on the top of the cover plate, wherein the wire harness board is provided with a buckle, and the buckle is connected to the wire.

18. The vehicle according to claim 11, wherein the battery module further comprises a circuit board, wherein the circuit board is arranged on the top of the cover plate, and the circuit board comprises a connector socket; and wherein the connector plug is electrically connected to the connector socket.

* * * * *